(12) United States Patent
Uetsuki et al.

(10) Patent No.: US 10,711,647 B2
(45) Date of Patent: Jul. 14, 2020

(54) GAS TURBINE CASING AND GAS TURBINE

(71) Applicant: MITSUBISHI HEAVY INDUSTRIES AERO ENGINES, LTD., Aichi (JP)

(72) Inventors: Yasuyuki Uetsuki, Tokyo (JP); Eiichi Yanagisawa, Tokyo (JP); Tadayuki Hanada, Aichi (JP); Yohei Fujimoto, Aichi (JP); Takafumi Ota, Aichi (JP)

(73) Assignee: MITSUBISHI HEAVY INDUSTRIES AERO ENGINES, LTD., Aichi (JP)

( * ) Notice: Subject to any disclaimer, the term of this patent is extended or adjusted under 35 U.S.C. 154(b) by 96 days.

(21) Appl. No.: 15/765,448

(22) PCT Filed: Oct. 4, 2016

(86) PCT No.: PCT/JP2016/079511
§ 371 (c)(1),
(2) Date: Apr. 2, 2018

(87) PCT Pub. No.: WO2017/061433
PCT Pub. Date: Apr. 13, 2017

(65) Prior Publication Data
US 2018/0291766 A1    Oct. 11, 2018

(30) Foreign Application Priority Data

Oct. 5, 2015 (JP) .................................. 2015-197939

(51) Int. Cl.
*F01D 25/24* (2006.01)
*F02K 1/80* (2006.01)
*F02C 7/00* (2006.01)

(52) U.S. Cl.
CPC .......... *F01D 25/243* (2013.01); *F01D 25/24* (2013.01); *F02C 7/00* (2013.01); *F02K 1/80* (2013.01); *F05D 2220/323* (2013.01); *F05D 2240/14* (2013.01); *F05D 2260/31* (2013.01)

(58) Field of Classification Search
CPC ....................................................... F01D 25/243
See application file for complete search history.

(56) References Cited

U.S. PATENT DOCUMENTS

| 4,469,470 A | * | 9/1984 | Geary | ..................... F01D 5/082 415/115 |
| 2012/0163964 A1 | * | 6/2012 | Chuong | ................ F01D 25/246 415/191 |
| 2015/0143816 A1 | * | 5/2015 | Salunkhe | .................. F02K 1/04 60/796 |
| 2016/0369656 A1 | * | 12/2016 | Mulcaire | ............... B22F 3/1258 |

FOREIGN PATENT DOCUMENTS

JP            2012-21618 A     2/2012

* cited by examiner

*Primary Examiner* — Woody A Lee, Jr.
(74) *Attorney, Agent, or Firm* — Hauptman Ham, LLP (57) ABSTRACT

Included in a gas turbine casing and a gas turbine are a first casing that has a first flange portion, first connecting holes, and first notches; a second casing that has a second flange portion, a plurality of second connecting holes, and second notches; and fastening bolts to fasten the first flange portion and the second flange portion with the portions being closely attached to each other and with each fastening bolt penetrating the corresponding first and second connecting holes. A first radial direction ratio (L/H) is set to be from 0.09 to 0.11 where H is a length of each of the first flange portion and the second flange portion in a radial direction, and L is a length of each of the first notch and the second notch in a radial direction.

7 Claims, 4 Drawing Sheets

GAS TURBINE CASING AND GAS TURBINE

RELATED APPLICATIONS

The present application is a National Phase of PCT International Application Number PCT/JP2016/079511, filed Oct. 4, 2016, which claims priority of Japanese Application No. 2015-197939, filed Oct. 5, 2015.

FIELD

The present invention relates to a gas turbine casing configured to accommodate a compressor, a combustor, and a turbine, and the gas turbine.

BACKGROUND

For example, a gas turbine is used as an aircraft engine of, for example, a helicopter and a jet plane. The aircraft gas turbine is made up of a compressor, a combustor, and a turbine. Therefore, the compressor compresses air taken in from an air inlet to generate high-temperature and high-pressure compressed air, and the combustor supplies fuel to the compressed air to burn the fuel to generate high-temperature and high-pressure combustion gas, such that the combustion gas drives the turbine. In the case of a helicopter, a rotor is rotated by the driving force of the turbine; in the case of a jet plane, thrust is produced by the energy of exhaust gas.

The compressor, the combustor, and the turbine as components of an aircraft gas turbine are accommodated in a casing having a cylindrical shape. The casing includes, for example, a first casing to accommodate the compressor, a second casing to accommodate the combustor, and a third casing to accommodate the turbine, and the three casings are serially connected with one another. In this case, each casing is provided with a flange portion having a ring shape at an end of a case body having a cylindrical shape, and the respective flange portions are fastened by a plurality of bolts and connected with each other with the respective flange portions being closely attached to each other.

At the time of operating the aircraft gas turbine, the casing becomes high temperature because high-temperature combustion gas and exhaust gas flow into the casing. The outside of the casing is exposed to low-temperature ambient air; the inside of the casing comes into contact with the high-temperature gas. Therefore, sudden changes in temperature occur at the time of activating or stopping, thereby increasing the temperature difference between the inside and outside of the aircraft gas turbine, generating a large thermal stress, and increasing the amount of thermal deformation accordingly. Particularly, at a casing connecting portion, an increased temperature gradient from the casing body to an outer periphery of the flange portion generates a high stress exceeding a yield stress at bolt holes and the outer periphery of the flange portion. Accordingly, repetition of activating and stopping considerably decreases the service life of the flange portion because of the low-cycle fatigue acting on the flange portion.

To solve such a problem, for example, provided is a flange structure as described in Patent Literature 1 listed below. The flange structure of a pipe described in Patent Literature 1 is such that a plurality of notches depressed inward in a radial direction of the flange are formed on the outer periphery of the flange of the pipe, at intervals in a circumferential direction of the flange.

CITATION LIST

Patent Literature

Patent Literature 1: Japanese Patent Application Laid-open No. 2012-021618

SUMMARY

Technical Problem

In the Patent Literature 1 described above, notches are formed at predetermined intervals on the outer periphery of a flange of a pipe. An opening width of each of the notches is set to be two times or three times the width of the flange in the radial direction, the interval between the respective notches is set to be smaller than or equal to the width of the flange, and a depth of the notch from the outer periphery of the flange to the inside of the flange in the radial direction is set to be larger than or equal to one-half of the width of the flange. However, Patent Literature 1 relates to a flange portion of a simple pipe, and does not take bolt holes into consideration.

The present invention has been made in view of the above problems, and an object of the present invention is to provide a gas turbine casing and a gas turbine directed to extend the service life of the flange portion and to improve the reliability thereof by reducing a thermal stress generated in the flange portion.

Solution to Problem

A gas turbine casing to achieve the object is configured to accommodate a compressor, a combustor, and a turbine. The gas turbine casing includes: a first casing having a cylindrical shape and having a first flange portion, the first flange portion having a ring shape and being provided at an axial end of the first casing, the first flange portion having a plurality of first connecting holes provided along a circumferential direction of the first flange portion; a plurality of first notches provided on an outer periphery of the first flange portion such that the respective first notches are provided between the first connecting holes; a second casing having a cylindrical shape and having a second flange portion, the second flange portion having a ring shape being provided at an axial end of the second flange portion, the second flange portion having a plurality of second connecting holes provided along a circumferential direction of the second flange portion; a plurality of second notches provided on an outer periphery of the second flange portion such that the respective second notches are provided between the second connecting holes; and a plurality of fastening bolts to fasten the first flange portion and the second flange portion with the portions being closely attached to each other and with each fastening bolt penetrating the corresponding first connecting hole and the corresponding second connecting hole. A first radial direction ratio L/H is set to be from 0.09 to 0.11, where H is a length of each of the first flange portion and the second flange portion in a radial direction, and L is a length of each of the first notch and the second notch in a radial direction.

Accordingly, the plurality of second notches provided between the connecting holes on the outer periphery of the flange portion of each of the casings can suppress, even when a thermal stress is generated due to a temperature difference between the inside and outside of the casings, an increase of the generated thermal stress. Further, setting the optimum values in the relation between the length of the flange portion in the radial direction and the length of the notch in the radial direction, can reduce the thermal stress generated in the flange portion, thereby extending the service life of the flange portion, and also improve the reliability.

In the gas turbine casing according to the present invention, set values for the first radial direction rate L/H are set such that a maximum stress acting on the first connecting holes and the second connecting holes and a maximum stress acting on the first notches and the second notches each become less than or equal to a preset reference value.

Accordingly, setting the first radial direction rate L/H such that the maximum stress acting on the respective connecting holes and the maximum stress acting on the respective notches each become less than or equal to the reference value, can reduce the stress acting on the connecting holes and the notches.

In the gas turbine casing according to the present invention, a second radial direction rate H/R is set to be from 0.254 to 0.258, where R is an inner diameter of the first casing and the second casing.

Accordingly, setting the optimum values in the relation between the length of the respective flange portions in the radial direction and the inner diameter of the respective casings in the radial direction, can reduce the thermal stress generated in the flange portions, thereby extending the service life of the flange portions, and also improve the reliability.

In the gas turbine casing according to the present invention, set values for the second radial direction rate H/R are set such that a maximum stress acting on the first connecting holes and the second connecting holes and a maximum stress acting on the first notches and the second notches each become less than or equal to a preset reference value.

Accordingly, setting the second radial direction rate H/R such that the maximum stress acting on the respective connecting holes and the maximum stress acting on the respective notches become less than or equal to the reference value, can reduce the stress acting on the connecting holes and the notches.

In the gas turbine casing according to the present invention, an inner diameter R of the first casing and the second casing, a length H of the first flange portion and the second flange portion in a radial direction, and a length D from centers of the first casing and the second casing to centers of the first connecting holes and the second connecting holes in a radial direction are set according to design specifications of the compressor, the combustor, and the turbine.

Accordingly, setting the inner diameters of the casings, the length of the flange portions in the radial direction, and the length from centers of the casings to centers of the connecting holes in the radial direction according to the design specifications of the compressor, the combustor, and the turbine, and also designing the set values of the first radial direction rate L/H and the second radial direction rate H/R based thereon, can provide simple settings of the first radial direction rate L/H and the second radial direction rate H/R.

In the gas turbine casing according to the present invention, the gas turbine casing is used for an aircraft engine casing.

Accordingly, the thermal stress generated in flange portions of the aircraft engine casing can be reduced to extend the service life of the flange portions and to improve the reliability.

A gas turbine according to the present invention includes: the gas turbine casing, the compressor accommodated in the gas turbine casing, the combustor accommodated in the gas turbine casing, and the turbine accommodated in the gas turbine casing.

Accordingly, setting the optimum values in the relation between the length of the flange portions in the radial direction and the length of the notches in the radial direction can reduce the thermal stress generated in the flange portions to extend the service life of the flange portions and to improve the reliability.

Advantageous Effects of Invention

According to the gas turbine casing and the gas turbine according to the present invention, setting optimum values in the relation between the length of the flange portion in the radial direction and the length of the notch in the radial direction such that the first radial direction ratio L/H is set to be from 0.09 to 0.11, can reduce a thermal stress generated in the flange portion, thereby extending the service life of the flange portion and improving the reliability.

DESCRIPTION OF EMBODIMENTS

Exemplary embodiments of a gas turbine casing and a gas turbine according to the present invention will be described below in detail with reference to the accompanying drawings. The present invention is not limited to the embodiments, and when there are a plurality of embodiments, those formed by combining these embodiments are also included in the present invention.

First Embodiment

Figure 1:
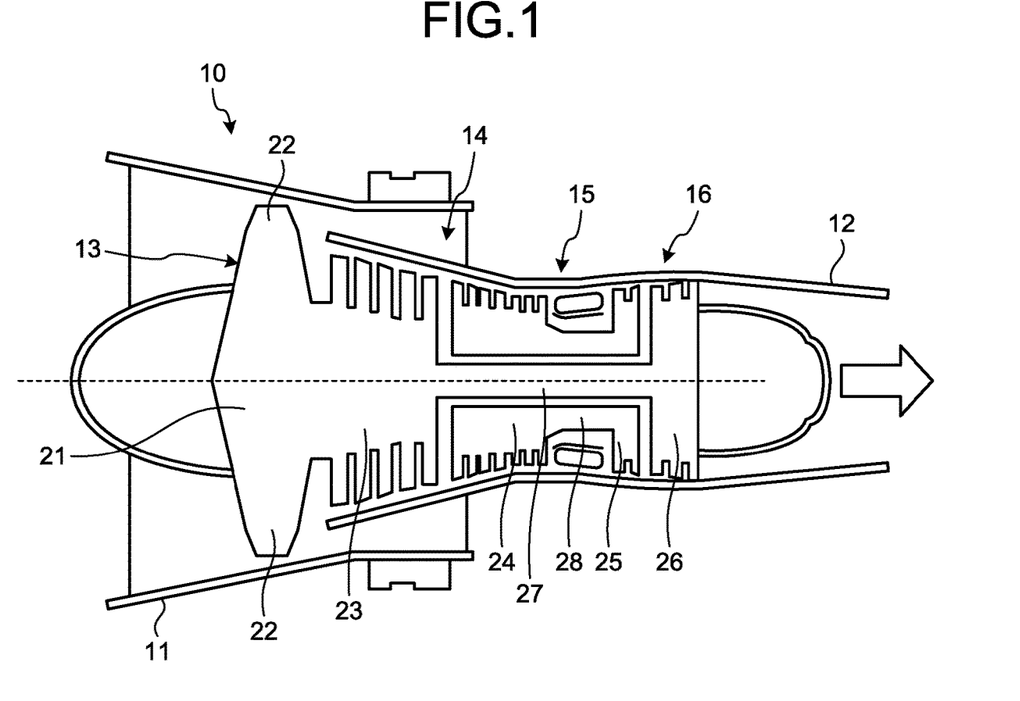
FIG. 1 is a schematic configuration diagram illustrating an aircraft engine according to a first embodiment.

FIG. 1 is a schematic configuration diagram illustrating an aircraft engine according to a first embodiment.

According to the first embodiment, as illustrated in FIG. 1, an aircraft engine 10 as a gas turbine includes a fan casing 11 and a body casing 12, and is configured such that a fan 13 is accommodated in the fan casing 11, and a compressor 14, a combustor 15, and a turbine 16 are accommodated in the body casing 12.

The fan 13 is configured such that a plurality of fan blades 22 are attached to an outer periphery of a rotation shaft 21.

The compressor 14 includes a low-pressure compressor 23 and a high-pressure compressor 24. The combustor 15 is arranged on a downstream side with respect to the compressor 14 in a flow direction of compressed air, and the combustor 15 is arranged in plural in a circumferential direction. The turbine 16 is arranged on a downstream side with respect to the combustor 15 in a flow direction of combustion gas and includes a high-pressure turbine 25 and a low-pressure turbine 26. The rotation shaft 21 of the fan 13 is connected with the low-pressure compressor 23, and the low-pressure compressor 23 is connected with the low-pressure turbine 26 by a first rotor shaft 27. The high-pressure compressor 24 and the high-pressure turbine 25 are connected with each other by a second rotor shaft 28 having a cylindrical shape and located on an outer peripheral side of the first rotor shaft 27.

Accordingly, in the compressor 14, air taken in from an air inlet is compressed as passing through a plurality of compressor vanes and turbine blades, but not illustrated, in the low-pressure compressor 23 and the high-pressure compressor 24, thereby generating high-temperature and high-pressure compressed air. The combustor 15 supplies predetermined fuel to the compressed air to burn the fuel, thereby generating high-temperature and high-pressure combustion gas. The combustion gas generated by the combustor 15 passes through a plurality of turbine vanes and turbine blades, but not illustrated, in the high-pressure turbine 25 and the low-pressure turbine 26, thereby driving and rotating the turbine 16. In this case, a rotation force of the low-pressure turbine 26 is transmitted to the low-pressure compressor 23 by the first rotor shaft 27 to rotate the low-pressure compressor 23. Further, a rotation force of the high-pressure turbine 25 is transmitted to the high-pressure compressor 24 by the second rotor shaft 28 to rotate the high-pressure compressor 24. As a result, the fan 13 can be driven and a thrust can be produced by exhaust gas discharged from the turbine 16.

In the body casing 12 that accommodates the compressor 14, the combustor 15, and the turbine 16, a plurality of casings are serially connected with one another and are connected by a plurality of fastening bolts.

Figure 2:
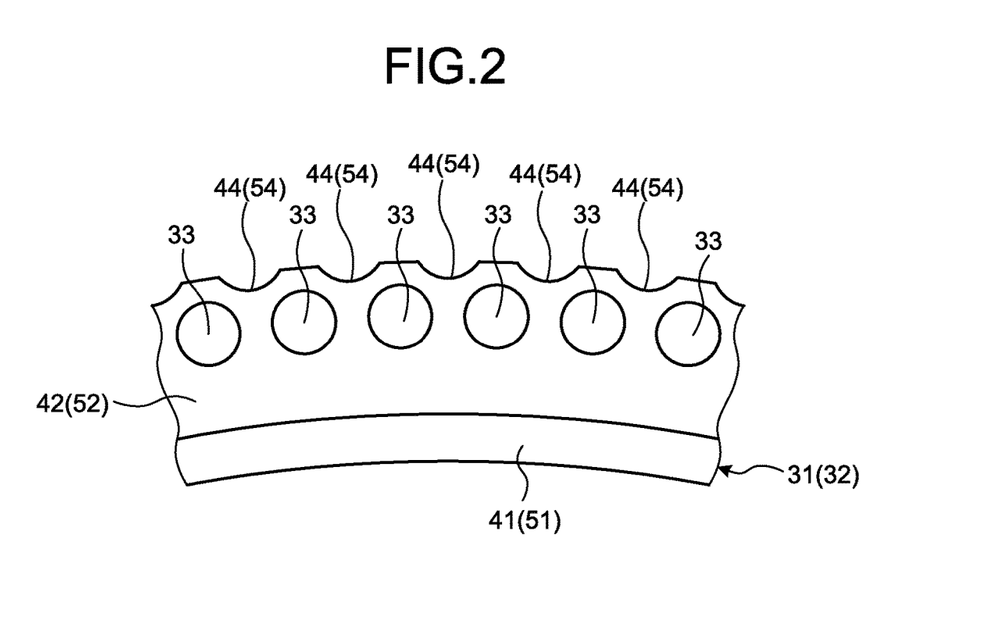
FIG. 2 is an enlarged view of relevant parts illustrating an aircraft engine casing according to the first embodiment.
Figure 3:
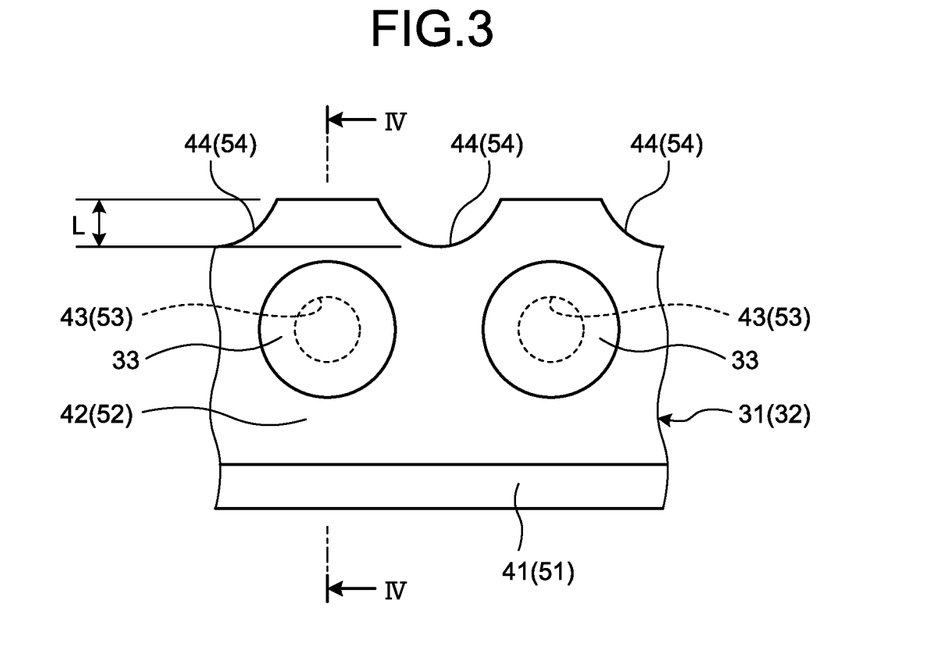
FIG. 3 is a schematic diagram illustrating a connecting portion of casings.
Figure 4:
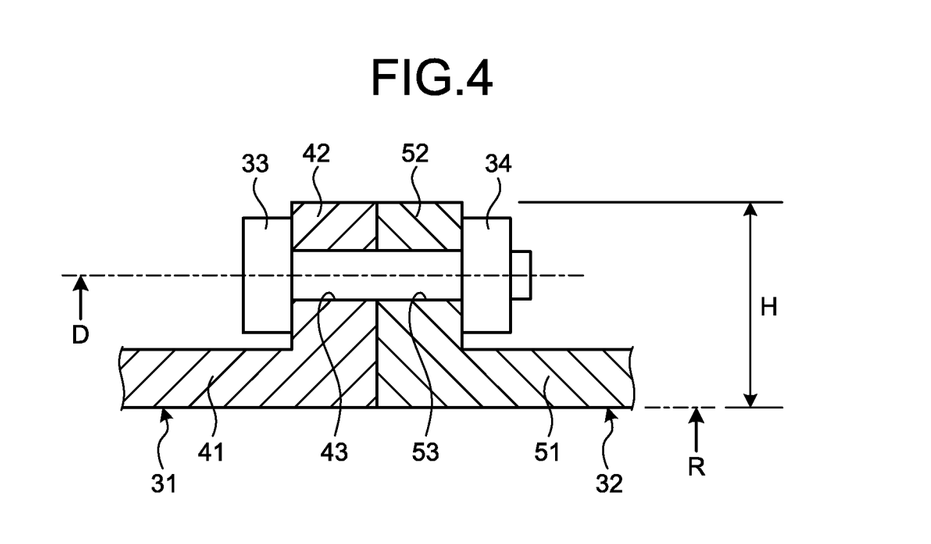
FIG. 4 is a IV-IV sectional view of FIG. 3 illustrating the connecting portion of the casings.

FIG. 2 is an enlarged view of relevant parts illustrating an aircraft engine casing according to the first embodiment, FIG. 3 is a schematic diagram illustrating a connecting portion of casings, and FIG. 4 is a IV-IV sectional view of FIG. 3 illustrating the connecting portion of the casings.

The body casing 12 includes, as illustrated in FIG. 2 to FIG. 4, a first casing 31 and a second casing 32. The first casing 31 includes a first casing body 41, a first flange portion 42, a plurality of first connecting holes 43, and a plurality of first notches 44. The first casing body 41 has a cylindrical shape and the first flange portion 42 has a ring shape and is integrally formed with the first casing body 41 at one axial end thereof. The first connecting holes 43 are holes that are provided on the first flange portion 42 at predetermined intervals (at regular intervals) therebetween along the circumferential direction thereof, and that axially penetrate the first casing body 41. The first notches 44 are provided on an outer periphery of the first flange portion 42 at a predetermined interval (at a regular interval) therebetween along the circumferential direction thereof, and axially penetrate the first casing body 41. The respective first notches 44 are provided between the first connecting holes 43.

The second casing 32 includes a second casing body 51, a second flange portion 52, a plurality of second connecting holes 53, and a plurality of second notches 54. The second casing body 51 has a cylindrical shape and the second flange portion 52 has a ring shape and is integrally formed with the second casing body 51 at one axial end thereof. The second connecting holes 53 are holes that are provided on the second flange portion 52 at predetermined intervals (at regular intervals) therebetween along the circumferential direction thereof, and that axially penetrate the second casing body 51. The second notches 54 are provided on an outer periphery of the second flange portion 52 at predetermined intervals (at regular intervals) therebetween along the circumferential direction thereof, and axially penetrate the second casing body 51. The respective second notches 54 are provided between the second connecting holes 53.

Outer diameters and inner diameters of the first casing body 41 of the first casing 31 and the second casing body 51 of the second casing 32 are set to the same diameters near respective ends facing each other. Further, the first flange portion 42, the first connecting holes 43, and the first notches 44 of the first casing 31 have substantially the same shapes as the second flange portion 52, the second connecting holes 53, and the second notches 54 of the second casing 32, and positions of the respective first connecting holes 43 and the respective first notches 44, and positions of the respective second connecting holes 53 and the respective second notches 54 match each other.

A plurality of fastening bolts 33 penetrate the respective first connecting holes 43 and the respective second connecting holes 53, and a plurality of nuts 34 are screwed therewith and fastened to connect the first casing 31 and the second casing 32 with each other, in a state where the first flange portion 42 and the second flange portion 52 are closely attached to each other.

In the first embodiment, an inner diameter R of the first casing 31 (the first casing body 41 and the first flange portion 42) and the second casing 32 (the second casing body 51 and the second flange portion 52), a length H of the first flange portion 42 and the second flange portion 52 in the radial direction, and a length D from centers of the first casing 31 (the first casing body 41) and the second casing 32 (the second casing body 51) to centers of the first connecting holes 43 and the second connecting holes 53 in the radial direction are determined according to the design specifications of the aircraft engine 10, that is, of the compressor 14, the combustor 15, and the turbine 16.

In the first embodiment, a first radial direction ratio L/H is set to be from 0.09 to 0.11 where the length of the first notch 44 and the second notch 54 in the radial direction is assumed to be L. In this case, it is preferable to set the first radial direction ratio L/H to 0.1.

Set values for the first radial direction ratio L/H are set such that a maximum stress acting on the first connecting holes 43 and the second connecting holes 53 and a maximum stress acting on the first notches 44 and the second notches 54 each become less than or equal to a preset reference value.

That is, the body dimensions of the respective casings 31 and 32: the inner diameter R, the length H of the respective flange portions 42 and 52 in the radial direction, and the length D from the centers of the respective casings 31 and 32 to the centers of the respective connecting holes 43 and 53 in the radial direction, are determined according to the engine design specifications. Here, if a temperature difference increases between the inside and outside of the flange portions 42 and 52, a circumferential tensile stress on the outer peripheries of the flange portions 42 and 52 increases. Accordingly, the notches 44 and 54 as provided reduce the circumferential tensile stress. However, since stiffness is reduced due to the notches 44 and 54, a circumferential compressive stress on the inner peripheries of the flange portions 42 and 52 increases. The first radial direction rate L/H is determined such that the circumferential tensile stress on the outer peripheries of the flange portions 42 and 52 and the circumferential compressive stress on the inner peripheries thereof each become less than or equal to a reference value.

Figure 5:
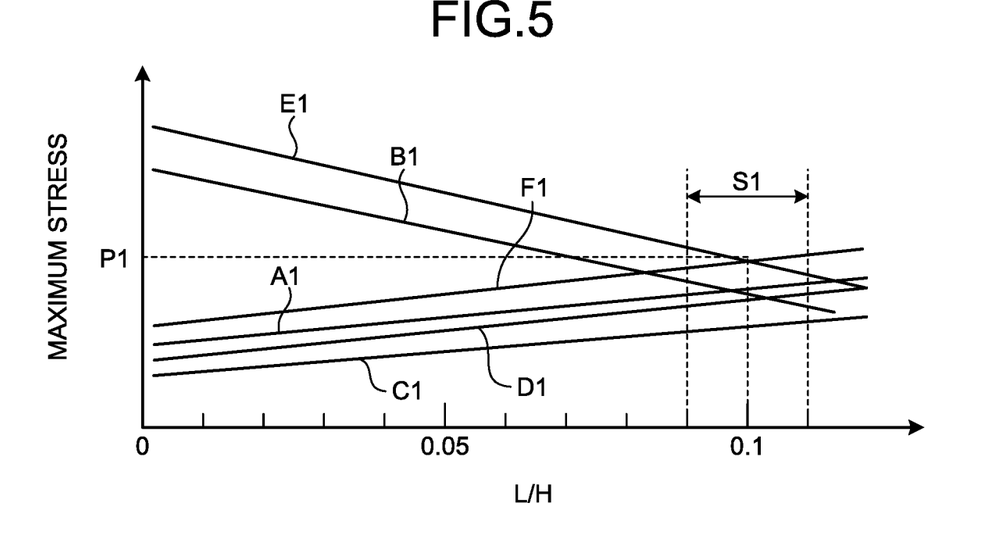
FIG. 5 is a graph representing a maximum stress in a connecting portion with respect to a first radial direction rate L/H.
Figure 6:
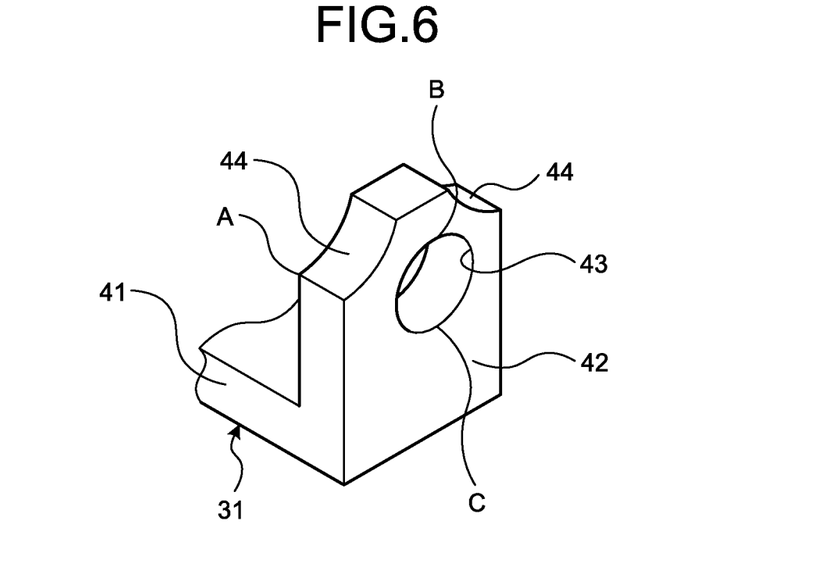
FIG. 6 is a perspective view illustrating a flange portion of a first casing.
Figure 7:
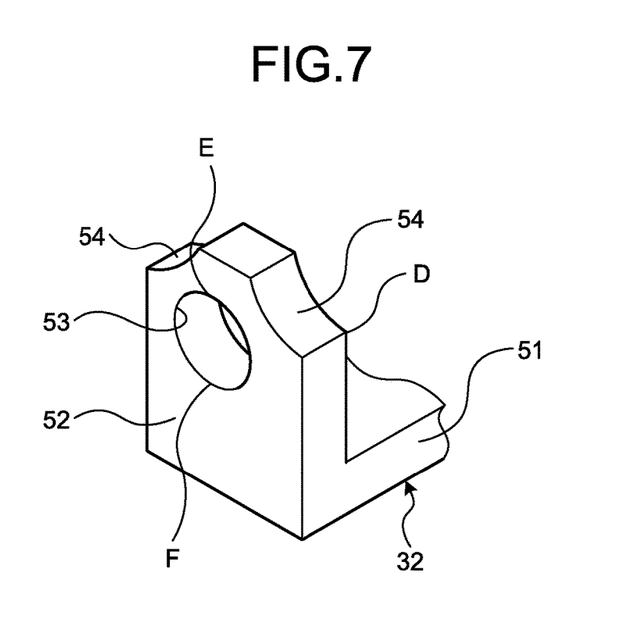
FIG. 7 is a perspective view illustrating a flange portion of a second casing.

FIG. 5 is a graph representing a maximum stress in a connecting portion with respect to the first radial direction rate L/H, FIG. 6 is a perspective view illustrating a flange portion of the first casing, and FIG. 7 is a perspective view illustrating a flange portion of the second casing.

Six lines illustrated in FIG. 5 represent a maximum stress when the first radial direction rate L/H is changed at respective points in the first flange portion 42 and the second flange portion 52. A line A illustrated in FIG. 5 represents a stress of the first notch 44 illustrated in FIG. 6, a line B illustrated in FIG. 5 represents a stress on the outer peripheral side of the first connecting hole 43 illustrated in FIG. 6, and a line C illustrated in FIG. 5 represents a stress on the inner peripheral side of the first connecting hole 43 illustrated in FIG. 6. Similarly, a line D illustrated in FIG. 5 represents a stress of the second notch 54 illustrated in FIG. 7, a line E illustrated in FIG. 5 represents a stress on the outer peripheral side of the second connecting hole 53 illustrated in FIG. 7, and a line F illustrated in FIG. 5 represents a stress on the inner peripheral side of the second connecting hole 53 illustrated in FIG. 7.

In the graph of FIG. 5, when the first radial direction rate L/H increases, a stress A1 of the first notch 44, a stress C1 on the inner peripheral side of the first connecting hole 43, a stress D1 of the second notch 54, and a stress F1 on the inner peripheral side of the second connecting hole 53 increase, whereas a stress B1 on the outer peripheral side of the first connecting hole 43 and a stress E1 on the outer peripheral side of the second connecting hole 53 decrease. This is believed to be because the stiffness on the outer peripheral side of the respective flange portions 42 and 52 is reduced as the first radial direction rate L/H increases, that is, as the lengths L of the respective notches 44 and 54 in the radial direction become longer.

A range S1 is a favorable range in which the first radial direction rate L/H is from 0.09 to 0.11 where the respective stresses A1, B1, C1, D1, E1, and F1 become substantially the same, and the first radial direction rate L/H=0.1 at which the respective stresses A1, B1, C1, D1, E1, and F1 fall in line within a lowest value P1 is optimum.

As described above, the aircraft engine casing according to the first embodiment includes the first casing 31 provided with the first flange portion 42, a plurality of first connecting holes 43, and a plurality of first notches 44, the second casing 32 provided with the second flange portion 52, a plurality of second connecting holes 53, and a plurality of second notches 54, and a plurality of fastening bolts 33 that penetrate the first connecting holes 43 and the second connecting holes 53 and are fastened in a state where the first flange portion 42 and the second flange portion 52 are closely attached to each other. The first radial direction rate L/H is set to be from 0.09 to 0.11 where H is the length of the first flange portion 42 and the second flange portion 52 in the radial direction, and L is the length of the first notches 44 and the second notches 54 in the radial direction.

Accordingly, the respective notches 44 and 54 provided between the respective connecting holes 43 and 53 on the outer periphery in the respective flange portions 42 and 53 of the respective casings 31 and 32, can suppress, even if a thermal stress is generated due to a temperature difference between the inside and outside of the casings 31 and 32, an increase of the generated thermal stress. Setting the optimum values in the relation between the length H of the flange portions 42 and 52 in the radial direction and the length L of the notches 44 and 54 in the radial direction, can reduce the thermal stress generated in the flange portions 42 and 52, thereby extending the service life of the flange portions 42 and 52 and improving the reliability.

In the aircraft engine casing according to the first embodiment, the set values for the first radial direction rate L/H are set such that the maximum stress acting on the first connecting holes 43 and the second connecting holes 53 and the maximum stress acting on the first notches 44 and the second notches 54 each become less than or equal to a preset reference value. Accordingly, the stress acting on the connecting holes 43 and 53 and the notches 44 and 54 can be reduced.

In the aircraft engine casing according to the first embodiment, the inner diameter R of the first casing 31 and the second casing 32, the length H of the first flange portion 42 and the second flange portion 52 in the radial direction, and the length D from the centers of the first casing 31 and the second casing 32 to the centers of the first connecting holes 43 and the second connecting holes 53 in the radial direction are set according to the design specifications of the compressor 14, the combustor 15, and the turbine 16. Accordingly, setting the inner diameter R of the casings 31 and 32, the length H of the flange portions 42 and 52 in the radial direction, and the length D from the centers of the casings 31 and 32 to the centers of the connecting holes 43 and 53 in the radial direction according to the design specifications of the compressor 14, the combustor 15, and the turbine 16, and also designing the set values for the first radial direction rate L/H and a second radial direction rate H/R: the inner diameter R, length H in the radial direction, and length D in the radial direction, can provide simple settings of the first radial direction rate L/H and the second radial direction rate H/R.

Further, in the aircraft engine casing according to the first embodiment, the body casing 12 for the aircraft engine, the compressor 14 accommodated in the body casing 12, the combustor 15 accommodated in the body casing 12, and the turbine 16 accommodated in the body casing 12 are provided. Accordingly, setting the optimal values in the relation between the length H of the flange portions 42 and 52 in the radial direction and the length L of the notches 44 and 54 in the radial direction, can reduce the thermal stress generated in the flange portions 42 and 52, thereby extending the service life of the flange portions 42 and 52 and improving the reliability.

Second Embodiment

Figure 8:
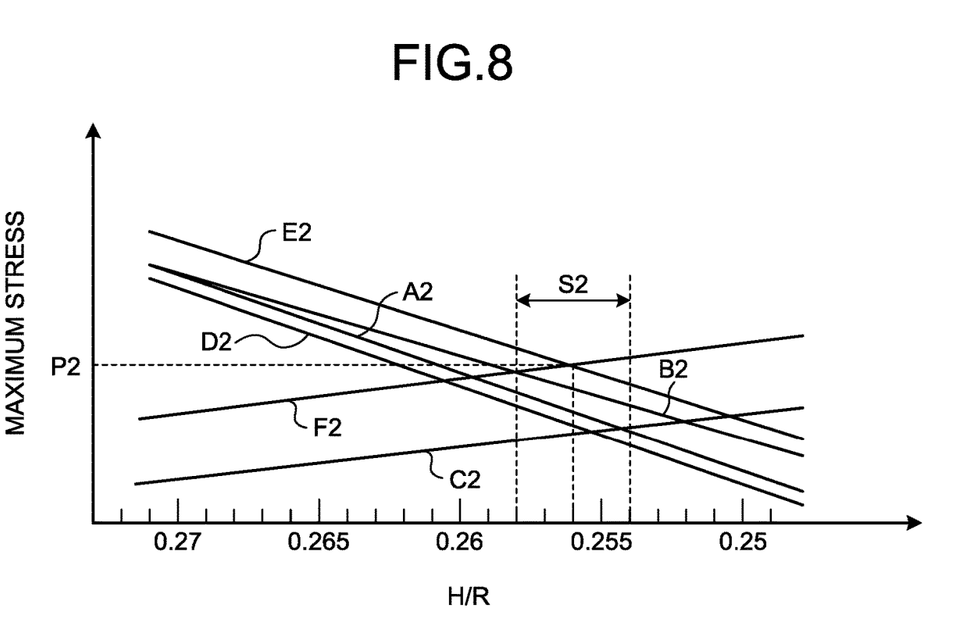
FIG. 8 is a graph representing a maximum stress in a connecting portion with respect to a second radial direction rate H/R in an aircraft engine casing according to a second embodiment.

FIG. 8 is a graph representing a maximum stress in a connecting portion with respect to the second radial direction rate H/R in an aircraft engine casing according to a second embodiment. The basic configurations of the aircraft engine casing according to the second embodiment are substantially identical to those of the first embodiment described above, and thus the second embodiment is described with reference to FIGS. 2 to 4, FIG. 6, and FIG. 7. Elements having functions identical to those of the first embodiment described above are denoted by like reference signs and detailed descriptions thereof will be omitted.

According to the second embodiment, as illustrated in FIG. 3 and FIG. 4, the inner diameter R of the first casing 31 (the first casing body 41, the first flange portion 42) and the second casing 32 (the second casing body 51, the second flange portion 52), the length H of the first flange portion 42 and the second flange portion 52 in the radial direction, and the length D from the centers of the first casing 31 (the first casing body 41) and the second casing 32 (the second casing body 51) to the centers of the first connecting holes 43 and the second connecting holes 53 in the radial direction are determined according to the design specifications of the aircraft engine 10, that is, of the compressor 14, the combustor 15, and the turbine 16.

The second radial direction rate H/R is set to be from 0.254 to 0.258. In this case, it is preferable to set the second radial direction rate H/R to 0.256.

A set value of the second radial direction rate H/R is set such that the maximum stress acting on the first connecting holes 43 and the second connecting holes 53 and the maximum stress acting on the first notches 44 and the second notches 54 each become less than or equal to a preset reference value.

That is, the body dimensions of the respective casings 31 and 32: the inner diameter R, the length H of the respective flange portions 42 and 52, and the length D from the centers of the respective casings 31 and 32 to the centers of the respective connecting holes 43 and 53 in the radial direction, are determined according to the engine design specifications. Here, if a temperature difference increases between the inside and outside of the flange portions 42 and 52, a circumferential tensile stress on the outer peripheries of the flange portions 42 and 52 increases. Accordingly, the notches 44 and 54 as provided reduce the circumferential tensile stress. However, since stiffness is reduced due to the notches 44 and 54, a circumferential compressive stress on the inner peripheries of the flange portions 42 and 52 increases. The set values for the second radial direction rate H/R are determined such that the circumferential tensile stress on the outer peripheries of the flange portions 42 and 52 and the circumferential compressive stress on the inner peripheries thereof each become less than or equal to a reference value.

Six lines illustrated in FIG. 8 represent a maximum stress when the second radial direction rate H/R is changed at respective points in the first flange portion 42 and the second flange portion 52. A line A illustrated in FIG. 8 represents a stress of the first notches 44 illustrated in FIG. 6, a line B illustrated in FIG. 8 represents a stress on the outer peripheral side of the first connecting hole 43 illustrated in FIG. 6, and a line C illustrated in FIG. 8 represents a stress on the inner peripheral side of the first connecting hole 43 illustrated in FIG. 6. Similarly, a line D illustrated in FIG. 8 represents a stress of the second notch 54 illustrated in FIG. 7, a line E illustrated in FIG. 8 represents a stress on the outer peripheral side of the second connecting hole 53 illustrated in FIG. 7, and a line F illustrated in FIG. 8 represents a stress on the inner peripheral side of the second connecting hole 53 illustrated in FIG. 7.

In the graph of FIG. 8, if the second radial direction rate H/R decreases, a stress A2 of the first notches 44, a stress B2 on the outer peripheral side of the first connecting holes 43, a stress D2 of the second notch 54, and a stress E2 on the outer peripheral side of the second connecting hole 53 decrease, whereas a stress C2 on the inner peripheral side of the first connecting hole 43 and a stress F2 on the inner peripheral side of the second connecting hole 53 increase. This is believed to be because the temperature difference between the outer peripheral side and the inner peripheral side of the respective flange portions 42 and 52 decreases and thus the thermal stress generated in the circumferential direction decreases as the second radial direction rate H/R decreases, that is, as the length H of the respective flange portions 42 and 52 in the radial direction becomes shorter.

A range S2 is a favorable range in which the second radial direction rate H/R is from 0.254 to 0.258 where the respective stresses A2, B2, C2, D2, E2, and F2 become substantially the same, and the second radial direction rate H/R=0.256 at which the respective stresses A2, B2, C2, D2, E2, and F2 fall in line within a lowest value P2 is optimum.

As described above, according to the aircraft engine casing of the second embodiment, the second radial direction rate H/R is set to be from 0.254 to 0.258 where R is the inner diameter of the first casing 31 and the second casing 32.

accordingly, setting the optimum values in the relation between the length H of the respective flange portions 42 and 52 in the radial direction and the inner diameter R of the respective casings 31 and 32, can reduce a thermal stress generated in the flange portions 42 and 52, thereby extending the service life of the flange portions 42 and 52, and improving the reliability.

According to the aircraft engine casing of the second embodiment, the set values for the second radial direction rate H/R are set such that the maximum stress acting on the first connecting holes 43 and the second connecting holes 53 and the maximum stress acting on the first notches 44 and the second notches 54 each become less than or equal to a preset reference value. Accordingly, the stress acting on the connecting holes 43 and 53 and the notches 44 and 54 can be reduced.

In the above embodiments, the gas turbine casing according to the present invention has been described as an aircraft engine casing, and the gas turbine according to the present invention has been described as an aircraft engine; however, the gas turbine casing and the gas turbine according to the present invention can be respectively applied to a gas turbine casing and a gas turbine for power-generation or propulsion, that are used on land or for ships.

The invention claimed is:

1. A gas turbine casing configured to accommodate a compressor, a combustor, and a turbine, the gas turbine casing comprising:
    a first casing having a cylindrical shape and having a first flange portion, the first flange portion having a ring shape and being provided at an axial end of the first casing, the first flange portion having a plurality of first connecting holes provided along a circumferential direction of the first flange portion;
    a plurality of first notches provided on an outer periphery of the first flange portion such that the respective first notches are provided between the first connecting holes;
    a second casing having a cylindrical shape and having a second flange portion, the second flange portion having a ring shape being provided at an axial end of the second flange portion, the second flange portion having a plurality of second connecting holes provided along a circumferential direction of the second flange portion;
    a plurality of second notches provided on an outer periphery of the second flange portion such that the respective second notches are provided between the second connecting holes; and
    a plurality of fastening bolts to fasten the first flange portion and the second flange portion with the portions being closely attached to each other and with each fastening bolt penetrating the corresponding first connecting hole and the corresponding second connecting hole, wherein set values for a first radial direction rate L/H are set such that a maximum stress acting on the first connecting holes and the second connecting holes and a maximum stress acting on the first notches and the second notches each become less than or equal to a preset reference value, where H is a length of each of the first flange portion and the second flange portion in a radial direction, and L is a length of each of the first notch and the second notch in a radial direction.

2. The gas turbine casing according to claim 1, wherein the first radial direction ratio L/H is further set to be from 0.09 to 0.11.

3. The gas turbine casing according to claim 1, wherein set values for a second radial direction rate H/R are set such that a maximum stress acting on the first connecting holes and the second connecting holes and a maximum stress acting on the first notches and the second notches each become less than or equal to a preset reference value, where R is an inner diameter of the first casing and the second casing.

4. The gas turbine casing according to claim 3, wherein the second radial direction rate H/R is further set to be from 0.254 to 0.258.

5. The gas turbine casing according to claim 1, wherein an inner diameter R of the first casing and the second casing, a length H of the first flange portion and the second flange portion in a radial direction, and a length D from centers of the first casing and the second casing to centers of the first connecting holes and the second connecting holes in a radial direction are set according to design specifications of the compressor, the combustor, and the turbine.

6. The gas turbine casing according to claim 1, wherein the gas turbine casing is used for an aircraft engine casing.

7. A gas turbine comprising:

the gas turbine casing according to claim 1;

the compressor accommodated in the gas turbine casing;

the combustor accommodated in the gas turbine casing; and the turbine accommodated in the gas turbine casing.

* * * * *